(12) United States Patent
Oono et al.

(10) Patent No.: US 8,549,137 B2
(45) Date of Patent: Oct. 1, 2013

(54) MONITORING DEVICE, MONITORING SYSTEM, MONITORING METHOD, AND PROGRAM

(75) Inventors: Mitsuhiro Oono, Minato-ku (JP); Kiyoshi Kato, Minato-ku (JP)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 12/308,063

(22) PCT Filed: May 28, 2007

(86) PCT No.: PCT/JP2007/060774
§ 371 (c)(1),
(2), (4) Date: Dec. 5, 2008

(87) PCT Pub. No.: WO2007/142053
PCT Pub. Date: Dec. 13, 2007

(65) Prior Publication Data
US 2009/0198814 A1    Aug. 6, 2009

(30) Foreign Application Priority Data
Jun. 5, 2006    (JP) ................................. 2006-155794

(51) Int. Cl.
| G06F 15/00 | (2006.01) |
| G06F 17/18 | (2006.01) |
| G06F 11/30 | (2006.01) |
| G06F 11/00 | (2006.01) |
| G06F 15/177 | (2006.01) |
| G06F 15/173 | (2006.01) |
| G06F 13/00 | (2006.01) |
| G06F 9/44 | (2006.01) |
| G06F 9/46 | (2006.01) |
| G06F 17/00 | (2006.01) |
| G05B 11/01 | (2006.01) |

(52) U.S. Cl.
USPC ........... 709/224; 709/221; 709/223; 709/238; 700/19; 702/138; 702/179; 702/182; 702/188; 711/106; 711/141; 711/165; 717/127; 717/170; 718/104; 718/105; 726/1; 726/22; 726/23

(58) Field of Classification Search
None
See application file for complete search history.

(56) References Cited

U.S. PATENT DOCUMENTS

| 6,292,757 | B1 * | 9/2001 | Flanagan et al. ............... 702/138 |
| 6,477,667 | B1 * | 11/2002 | Levi et al. ........................ 714/57 |
| 6,792,455 | B1 | 9/2004 | DeLuca et al. |
| 6,950,766 | B2 * | 9/2005 | Okamoto et al. ............... 702/81 |

(Continued)

FOREIGN PATENT DOCUMENTS

| JP | 09-305384 A | 11/1997 |
| JP | 2000-163283 A | 6/2000 |

(Continued)

*Primary Examiner* — Moustafa M Meky
*Assistant Examiner* — Ho Shiu
(74) *Attorney, Agent, or Firm* — Sughrue Mion, PLLC (57) ABSTRACT

Diverting condition storage unit 15 stores diverting conditions describing conditions for hardware configurations and software configurations. Monitoring data storage unit 13 stores monitoring data on the hardware configurations and the software configurations on monitored devices. Monitoring setting information storage unit stores monitoring setting information on the monitored devices. By referencing monitoring data and diverting conditions, first setting-diverting unit judges if monitoring setting information set in a monitored device may be diverted as monitoring setting information on another monitored device and outputs the result to a management terminal. The system administrator diverts the monitoring setting information among multiple monitored devices based on judgment result.

21 Claims, 8 Drawing Sheets

(56) References Cited

U.S. PATENT DOCUMENTS

| | | | |
|---|---|---|---|
| 6,999,894 B2* | 2/2006 | Lin et al. | 702/179 |
| 7,224,679 B2* | 5/2007 | Solomon et al. | 370/338 |
| 7,421,695 B2* | 9/2008 | Murray et al. | 718/105 |
| 7,506,143 B2* | 3/2009 | Sarwono et al. | 713/1 |
| 7,634,559 B2* | 12/2009 | Brown | 709/224 |
| 7,671,728 B2* | 3/2010 | Buehler | 340/506 |
| 7,742,762 B1* | 6/2010 | Biere et al. | 455/423 |
| 2001/0056486 A1 | 12/2001 | Kosaka | |
| 2002/0070808 A1* | 6/2002 | Tichauer | 330/298 |
| 2003/0046424 A1* | 3/2003 | Kobayashi | 709/238 |
| 2003/0066277 A1* | 4/2003 | Behnke | 56/10.2 R |
| 2003/0135611 A1* | 7/2003 | Kemp et al. | 709/224 |
| 2004/0030323 A1* | 2/2004 | Ullestad et al. | 604/891.1 |
| 2004/0107310 A1* | 6/2004 | Lin | 711/106 |
| 2004/0249937 A1* | 12/2004 | Tachihara et al. | 709/224 |
| 2004/0261070 A1* | 12/2004 | Miller et al. | 717/170 |
| 2005/0015485 A1* | 1/2005 | Keefer et al. | 709/224 |
| 2005/0125688 A1* | 6/2005 | Ogawa et al. | 713/200 |
| 2005/0193153 A1* | 9/2005 | Fukano et al. | 710/8 |
| 2005/0197989 A1* | 9/2005 | Hori et al. | 706/47 |
| 2006/0117146 A1* | 6/2006 | Clisby | 711/141 |
| 2006/0136928 A1* | 6/2006 | Crawford et al. | 718/105 |
| 2006/0145834 A1* | 7/2006 | Berkman et al. | 340/538.17 |
| 2006/0187120 A1* | 8/2006 | Ohba et al. | 342/454 |
| 2006/0195561 A1* | 8/2006 | Keane et al. | 709/223 |
| 2006/0195569 A1* | 8/2006 | Barker | 709/224 |
| 2006/0200554 A1* | 9/2006 | Shen et al. | 709/224 |
| 2006/0236392 A1* | 10/2006 | Thomas et al. | 726/23 |
| 2006/0253507 A1* | 11/2006 | Schank et al. | 707/205 |
| 2006/0253568 A1* | 11/2006 | Lin | 709/224 |
| 2006/0277299 A1* | 12/2006 | Baekelmans et al. | 709/224 |
| 2006/0280207 A1* | 12/2006 | Guarini et al. | 370/524 |
| 2006/0282600 A1* | 12/2006 | Wang | 710/306 |
| 2007/0011420 A1* | 1/2007 | Boss et al. | 711/165 |
| 2007/0143611 A1* | 6/2007 | Arroyo et al. | 713/171 |
| 2007/0234365 A1* | 10/2007 | Savit | 718/104 |
| 2007/0282997 A1* | 12/2007 | Trochman | 709/224 |
| 2009/0164853 A1* | 6/2009 | Gokhale et al. | 714/57 |
| 2010/0169472 A1* | 7/2010 | Okamoto et al. | 709/224 |

FOREIGN PATENT DOCUMENTS

| | | |
|---|---|---|
| JP | 2001-356972 A | 12/2001 |
| JP | 2002-41327 A | 2/2002 |
| JP | 2004-94978 A | 3/2004 |
| JP | 2004-199143 A | 7/2004 |

* cited by examiner

DIVERTING-SOURCE MONITORED DEVICE : ID=Dev_0001

ADDED MONITORING SETTING INFORMATION

| MONITORING ITEM | MONITORING FREQUENCY | MONITORING METHOD |
|---|---|---|
| × × × | ○○○ | □□□ |

LIST OF DIVERTING-DESTINATION MONITORED DEVICES

| SELECT TO APPLY | MONITORED DEVICE ID |
|---|---|
| 33 — □ | □×□× |
| □ | ×□×□ |
| ⋮ | ⋮ |

34

REGISTER

FIG.10

MONITORING DEVICE, MONITORING SYSTEM, MONITORING METHOD, AND PROGRAM

TECHNICAL FIELD (Related applications) This application claims priority to Japanese Patent Application No. 2006-155794 (filed Jun. 5, 2006) which is hereby expressly incorporated herein in its entirety by reference thereto.

The present invention relates to a technology for monitoring the status of a monitored device, and more particularly to a monitoring device, a monitoring system, and a monitoring method that have the function to help the system administrator perform the monitoring setup work for a monitored device.

BACKGROUND ART

An information processing system that allows the user to exchange or share data via the Internet is widely used in companies and other organizations. This type of information processing system provides various operation services that meet user's needs. As more and more new services are provided or existing business services become more and more improved, an information processing system gets larger year after year.

On the other hand, the management of always keeping an information processing system running has become one of important management problems. This management, which requires special knowledge and technology, is generally entrusted to a special operation service company. Usually, an operation service company builds a monitoring system for managing the status of monitored devices and, using that system, always monitors the status of the monitored devices. In general, a monitoring system comprises two types of subsystems: one is a monitoring agent that is installed in each monitored device and the other is a monitoring manager that is installed in the monitoring device (for example, see Patent Document 1).

A monitoring agent collects monitoring data from a monitored device, where the monitoring agent is installed, according to the monitoring setting information that indicates what information on the monitored device is to be collected and how often and how it is to be collected, and sends the collected monitoring data to the monitoring device. On the other hand, the monitoring device sets the monitoring setting information in the monitoring agents, receives monitoring data, and accumulates the received data in the database. The monitoring setting information that is set in the monitoring agents is created in advance for each monitored device by the system administrator and is stored in the storage device. The monitoring manager reads the monitoring setting information from the storage device and sends it to a monitoring agent.

Patent Document 1: Japanese Patent Publication Kokai JP-A No. 2002-41327

DISCLOSURE OF THE INVENTION

Problems to be Solved by the Invention

The following analysis is made from the viewpoint of the present invention.

Note that the disclosure of Patent Document 1 is hereby incorporated into this specification by reference thereto.

To manage the status of the monitored devices, it is necessary to set the monitoring setting information suitable for each monitored device. In a large information processing system in which there are multiple types of monitored devices, selecting the monitoring setting information suitable for individual monitored devices puts a heavy load on the system administrator.

It is an object of the present invention to reduce the system administrator's load involved in setting the monitoring setting information.

Means to Solve the Problems

According to a first aspect of the present invention, there is provided a monitoring device comprising: a monitoring manager that sets up monitoring for a monitoring agent in a monitored device according to monitoring setting information stored in a monitoring setting information storage unit, receives monitoring data on a hardware configuration and a software configuration sent from the monitoring agent, and stores the received monitoring data in the monitoring data storage unit; wherein the monitoring device further comprises:

a diverting condition storage unit that stores diverting conditions describing conditions for hardware configurations and software configurations; and a setting diverting unit that judges if monitoring setting information, which is set in a monitored device, may be diverted as monitoring setting information on another monitored device by referencing the monitoring data and the diverting conditions, and outputs the judged result.

In addition, it is preferable that the setting diverting unit of the monitoring device receives a specification of a diverting-destination monitored device from a management terminal and judges if monitoring setting information, which is set in a monitored device other than the specified diverting-destination monitored device, may be diverted as monitoring setting information on the diverting-destination monitored device.

In addition, it is preferable that the setting diverting unit of the monitoring device calculates a satisfaction degree of the diverting conditions for each monitored device, which is a diverting-source candidate, and decides a diverting-source monitored device, from which monitoring setting information may be diverted to the diverting-destination monitored device, by referencing the calculation result.

In addition, it is preferable that the monitoring device further comprises: a diverting condition presentation setting unit that displays a resource status, which is included in monitoring data on each monitored device stored in the monitoring data storage unit, on a screen of the management terminal and, when a system administrator specifies that a resource status selected on the screen by the system administrator be set to a diverting condition, sets a resource status, which indicates a status that is a reverse of the resource status, in the diverting condition storage unit.

In addition, it is preferable that the setting diverting unit of the monitoring device receives a specification of a diverting-source monitored device from a management terminal and judges if monitoring setting information, which is set in the specified diverting-source monitored device, may be diverted as monitoring setting information on another monitored device.

In addition, it is preferable that the setting diverting unit of the monitoring device calculates a satisfaction degree of the diverting conditions for each monitored device, which is a diverting-destination candidate, and decides a diverting-destination monitored device, to which monitoring setting information that is set in the diverting-source monitored device may be diverted, by referencing the calculation result.

According to a second aspect of the present invention, there is provided a monitoring system comprising:

a plurality of monitored devices each of which has a monitoring agent;

a monitoring device connected communicably to the plurality of monitored devices; and a management terminal connected to the monitoring device, wherein the monitoring device comprises:

a monitoring manager that sets up monitoring for the monitoring agents in the monitored devices according to monitoring setting information stored in a monitoring setting information storage unit, receives monitoring data on hardware configurations and software configurations sent from the monitoring agents, and stores the received monitoring data in the monitoring data storage unit;

a diverting condition storage unit that stores diverting conditions describing conditions for the hardware configurations and the software configurations; and a setting diverting unit that judges if monitoring setting information, which is set in a monitored device, may be diverted as monitoring setting information on another monitored device by referencing the monitoring data and the diverting conditions and outputs the judged result to the management terminal.

According to a third aspect of the present invention, there is provided a monitoring method and a program causing a computer to perform the method that is a monitoring method for monitoring monitored devices by a computer connected communicably to a plurality of the monitored devices, each of which has a monitoring agent, wherein the monitoring method comprises:

judging, by the computer, if monitoring setting information, which is set in a monitored device, may be diverted as monitoring setting information on another monitored device by referencing monitoring data and diverting conditions and outputting the judged result to a management terminal, the monitoring data being data on hardware configurations and software configurations of the monitored devices stored in a storage unit, the diverting conditions describing conditions for the hardware configurations and the software configurations, termed as a first step;

setting, by the computer, monitoring setting information, which is stored in the storage unit, in the monitoring agent of the monitored device according to an instruction from the management terminal, termed as a second step; and receiving, by the computer, monitoring data on the hardware configuration and the software configuration sent from the monitoring agent and storing the received monitoring data in the storage unit, termed as a third step.

In addition, it is preferable that the first step of the monitoring method comprises:

receiving a specification of a diverting-destination monitored device from the management terminal; and judging if monitoring setting information, which is set in a monitored device other than the specified diverting-destination monitored device, may be diverted as monitoring setting information on the diverting-destination monitored device.

In addition, it is preferable that the first step of the monitoring method comprises: calculating a satisfaction degree of the diverting conditions for each monitored device, which is a diverting-source candidate; and deciding a diverting-source monitored device, from which monitoring setting information may be diverted to the diverting-destination monitored device, by referencing the calculation result.

In addition, it is preferable that the first step of the monitoring method comprises:

receiving a specification of a diverting-source monitored device from the management terminal; and judging if monitoring setting information, which is set in the specified diverting-source monitored device, may be diverted as monitoring setting information on another monitored device.

In addition, it is preferable that the first step of the monitoring method comprises the steps of:

calculating a satisfaction degree of the diverting conditions for each monitored device, which is a diverting-destination candidate; and deciding a diverting-destination monitored device, to which monitoring setting information that is set in the diverting-source monitored device may be diverted, by referencing the calculation result.

<Operation>

In a large information processing system, there are monitored devices of various types and, at the same time, monitored devices having the same or similar hardware configuration and software configuration. In many cases, the monitored devices having the same or similar configuration use the same monitoring setting information. In view of the foregoing, the present invention prepares diverting conditions, which describe the conditions for the hardware configurations and software configurations, automatically judges if monitoring setting information, which is set in a monitored device, may be diverted as monitoring setting information on another monitored device based on the diverting conditions and monitoring data indicating the hardware configurations and the software configurations of the monitored devices, and presents the result to the system administrator.

Whether or not monitoring setting information that is set in a monitored device may be diverted to another monitored device may be judged by selecting a diverting-destination monitored device and judging if the monitoring setting information that is set in another monitored device may be diverted to the diverting-destination monitored device or by selecting a diverting-source monitored device and judging if the monitoring setting information that is set in the diverting-source monitored device may be diverted to another monitored device.

Meritorious Effects of the Invention

The present invention reduces the system administrator's load involved in setting the monitoring setting information. The reason is that the present invention automatically judges if the monitoring setting information that is set in a monitored device may be diverted as the monitoring setting information on another monitored device, based on the diverting conditions describing the conditions for the hardware configurations and software configurations and monitoring data indicating the hardware configurations and the software configurations of the monitored devices, and presents the result to the system administrator, thereby helping the system administrator in setting the monitoring setting information.

EXPLANATIONS OF SYMBOLS

1 . . . Monitoring device
11 . . . . Monitoring manager
12 . . . . Monitoring setting information storage unit
13 . . . . Monitoring data storage unit
14 . . . . First setting-diverting unit
15 . . . . Diverting condition storage unit
16 . . . . Second setting-diverting unit
17 . . . . Diverting condition presentation setting unit
2 . . . . Monitored device
21 . . . . Monitoring agent
3 . . . . Management terminal
4 . . . . Network

PREFERRED MODES FOR CARRYING OUT THE INVENTION

First Exemplary Embodiment

Figure 1:
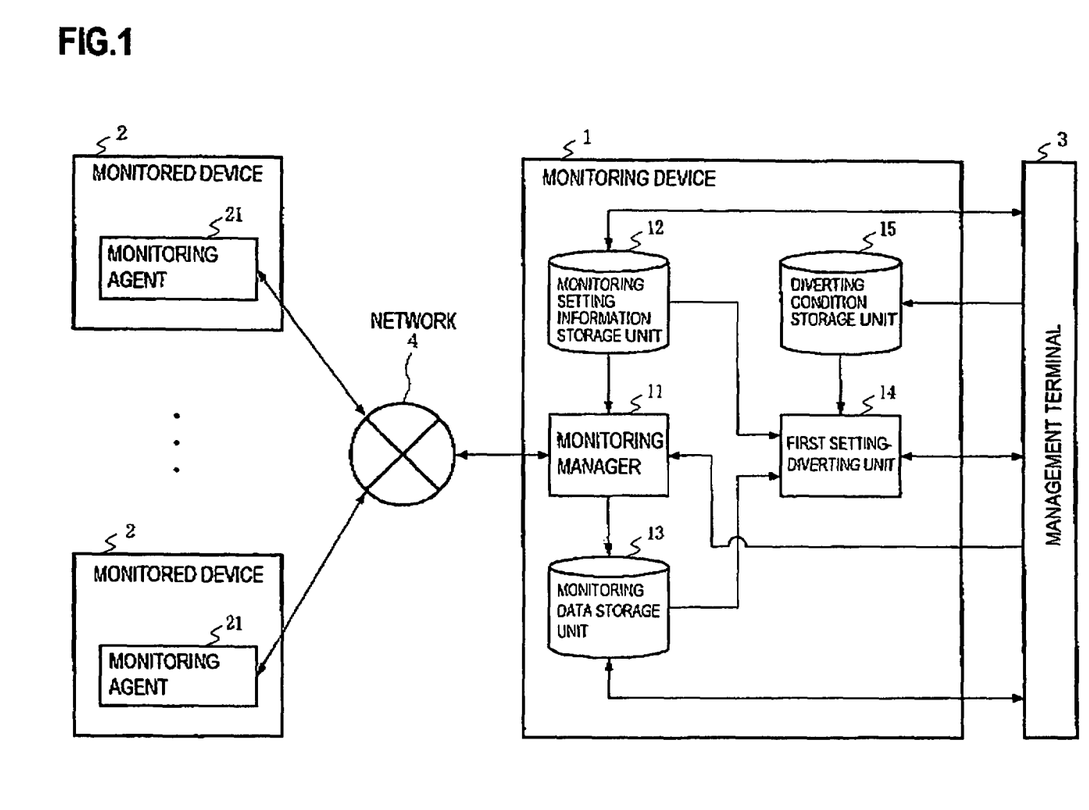
FIG. 1 is a block diagram showing a first exemplary embodiment of the present invention.

Referring to FIG. 1, a first exemplary embodiment of the present invention comprises a monitoring device 1, multiple monitored devices 2, a management terminal 3, and a network 4.

The monitoring device 1, a computer that monitors the status of the monitored devices 2, comprises a monitoring manager 11, a monitoring setting information storage unit 12, monitoring data storage unit 13, first setting-diverting unit 14, and diverting condition storage unit 15. Each monitored device 2 comprises a monitoring agent 21.

The monitoring setting information storage unit 12, a storage medium storing therein information on the monitoring setting used for collecting monitoring data from the monitored device 2, is configured, for example, by a hard disk. This monitoring setting information storage unit 12 may be accessed by the monitoring manager 11, first setting-diverting unit 14, and management terminal 3.

Each piece of monitoring setting information stored in the monitoring setting information storage unit 12 includes information that identifies the monitored device 2 to be monitored and information that identifies monitoring data to be acquired. In addition, the monitoring setting information storage unit 12 may include other information such as information that indicates a monitoring frequency or information that indicates a monitoring method.

The information that identifies the monitored device 2 is, for example, an identifier assigned to the monitored device 2.

The information that identifies monitoring data to be acquired is information indicating the type and the status of resources in the monitored device 2 that are monitored. The monitoring data acquired from the monitored device 2 includes data on both the hardware configuration and the software configuration. The monitoring data on the hardware configuration includes the names of hardware resources such as the CPU, their versions, their performance information, whether or not they are in operation, and their load information and usage status. Similarly, the monitoring data on the software configuration includes the names of software resources such as the OS and application programs, their versions, information stored in their initialization files, whether or not they are in operation, and their load information and usage status.

The information that indicates a monitoring frequency is, for example, information on a combination of the time indicating the monitoring interval, the monitoring start date/time or the day of week, and the monitoring end date/time or the day of week.

The information that indicates a monitoring method is a protocol used between the monitored device 2 and the monitoring device 1.

Examples of the protocol include a method in which an XML (Extensible Markup Language)-encoded schema is used for CIM operation and is accessible via HTTP (Hyper Text Transport Protocol), proposed by WBEM (Web-Based Enterprise Management) and the SNMP (Simple Network Management Protocol). The information that indicates a monitoring method may include a port number and the name of a monitoring program that collects monitoring data. An example of the port number is a numeric value ranging from 0 to 65535.

Figure 2:
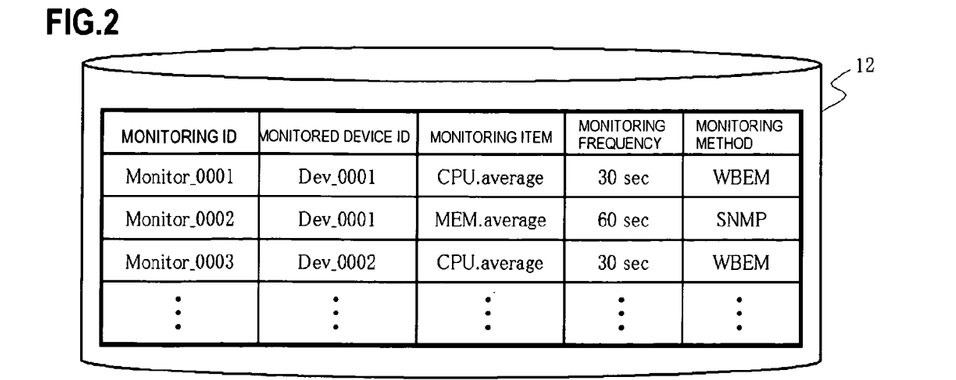
FIG. 2 is a diagram showing an example of monitoring setting information stored in a monitoring setting information storage unit in the first exemplary embodiment of the present invention.

FIG. 2 shows an example of monitoring setting information stored in the monitoring setting information storage unit 12. For example, the monitoring setting information with the identifier Monitor_0001 in the first row indicates that the average value of the CPU usage rate is acquired from the monitored device 2 with the identifier Dev_0001 at a 30-second interval using WBEM.

The monitoring data storage unit 13, a storage medium storing therein monitoring data acquired from the monitored devices 2, is configured, for example, by a hard disk. This monitoring data storage unit 13 may be accessed by the monitoring manager 11, first setting-diverting unit 14, and the management terminal 3.

Figure 3:
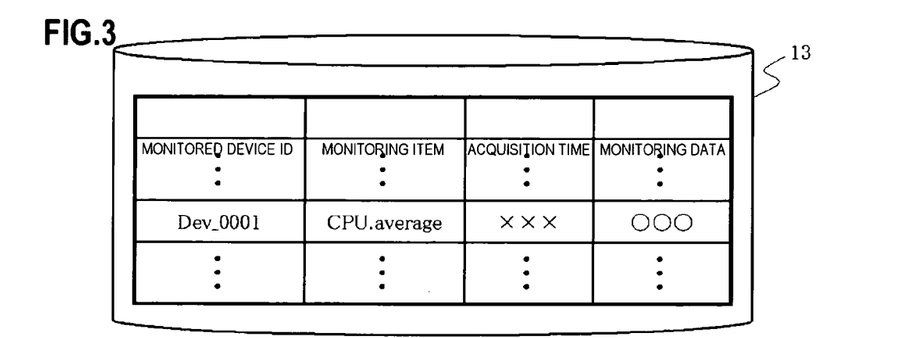
FIG. 3 is a diagram showing an example of monitoring data stored in a monitoring data storage unit in the first exemplary embodiment of the present invention.

FIG. 3 shows an example of the stored content of the monitoring data storage unit 13. In this example, the monitoring data, each composed of the identifier of the monitored device 2 at a client company, acquired monitoring item, and acquisition time, is stored.

The diverting condition storage unit 15, a storage medium storing therein diverting conditions describing conditions for the hardware configuration and the software configuration, is configured, for example, by a hard disk. This diverting condition storage unit 15 may be accessed by the first setting-diverting unit 14 and the management terminal 3.

Each diverting condition stored in the diverting condition storage unit 15 is composed of a condition ID and a condition content. The condition ID is an identifier for distinguishing each diverting condition from other diverting conditions. The condition content is the content of a condition for the hardware configuration and the software configuration required by the delivering-source monitored device 2.

Figure 4:
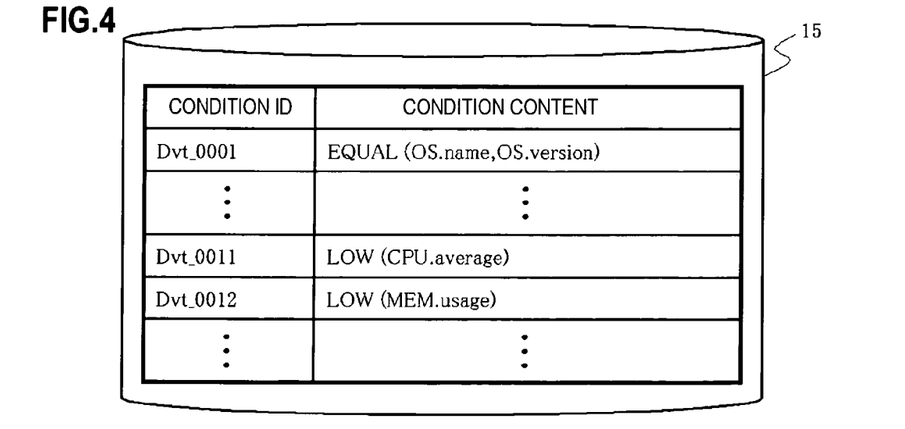
FIG. 4 is a diagram showing an example of diverting conditions stored in a diverting condition storage unit in the first exemplary embodiment of the present invention.

FIG. 4 shows an example of diverting conditions stored in the diverting condition storage unit 15. For example, the diverting condition with the condition ID Dvt_0001 indicates a condition that the name and the version of the OS must be equal between the diverting-source monitored device 2 and the diverting-destination monitored device 2. The diverting condition with the condition ID Dvt_0011 indicates a condition that the CPU usage rate of the diverting-source monitored device 2 must be low. Similarly, the diverting condition with the condition ID Dvt_0012 indicates a condition that the memory usage rate of the diverting-source monitored device 2 must be low.

The first setting-diverting unit 14 is the unit that decides other monitored device 2 whose monitoring setting information may be diverted to the monitored device 2 specified by the system administrator via the management terminal 3. More specifically, the first setting-diverting unit 14 references the monitoring data storage unit 13 and the diverting condition storage unit 15 to calculate the satisfaction degrees of the diverting condition for each monitored device 2 that is a diverting-source candidate, and references the calculation result to decide the monitored device 2, which has the highest diverting condition satisfaction degree, as a diverting source. The satisfaction degree of a diverting condition can be represented, for example, as the total of scores each of which is set when the corresponding diverting condition, stored in the diverting condition storage unit 15, is satisfied.

The monitoring manager 11 has a function to set up monitoring for the monitoring agent 21 of the monitored device 2, specified by the system administrator via the management terminal 3, according to the monitoring setting information on the monitored device 2 stored in the monitoring setting information storage unit 12. The monitoring manager 11 also has a function to receive monitoring data, which is sent from the monitoring agent 21 of the monitored device 2, and store the received monitoring data in the monitoring data storage unit 13.

The monitoring agent 21 of each monitored device 2 has the function to collect monitoring data from the monitored device 2 based on the monitoring setting information, which is set by the monitoring manager 11 of the monitoring device 1, and send the collected monitoring data to the monitoring manager 11.

The management terminal 3 is a terminal (console) that has the input device such as a keyboard or a mouse and the output device such as a display. The management terminal 3, connected to the monitoring device 1, has a function to send various instructions and data, entered by the system administrator, to the monitoring device 1 and a function to receive various types of data, sent from the monitoring device 1, and output the received data to the output device.

Next, the following describes the operation of this exemplary embodiment.

To divert the monitoring setting information from one monitored device 2 for setting it in another monitored device 2 as new monitoring setting information or to review the monitoring setting information that is already set in another monitored device 2, the system administrator enters a diverting-source information request, to which the identifier of the diverting-destination monitored device 2 is attached, from the management terminal 3 to the first setting-diverting unit 14 of the monitoring device 1. In this case, when the diverting-destination monitored device 2 is a new device and therefore the monitoring data is not stored in the monitoring data storage unit 13, the system administrator enters all known information on the hardware configuration and the software configuration of the monitored device 2 from the management terminal 3 to store the entered information in the monitoring data storage unit 13. In addition, the system administrator confirms the diverting condition, stored in the diverting condition storage unit 15, via the management terminal 3 and, as necessary, adds new diverting conditions or deletes existing diverting conditions.

Figure 5:
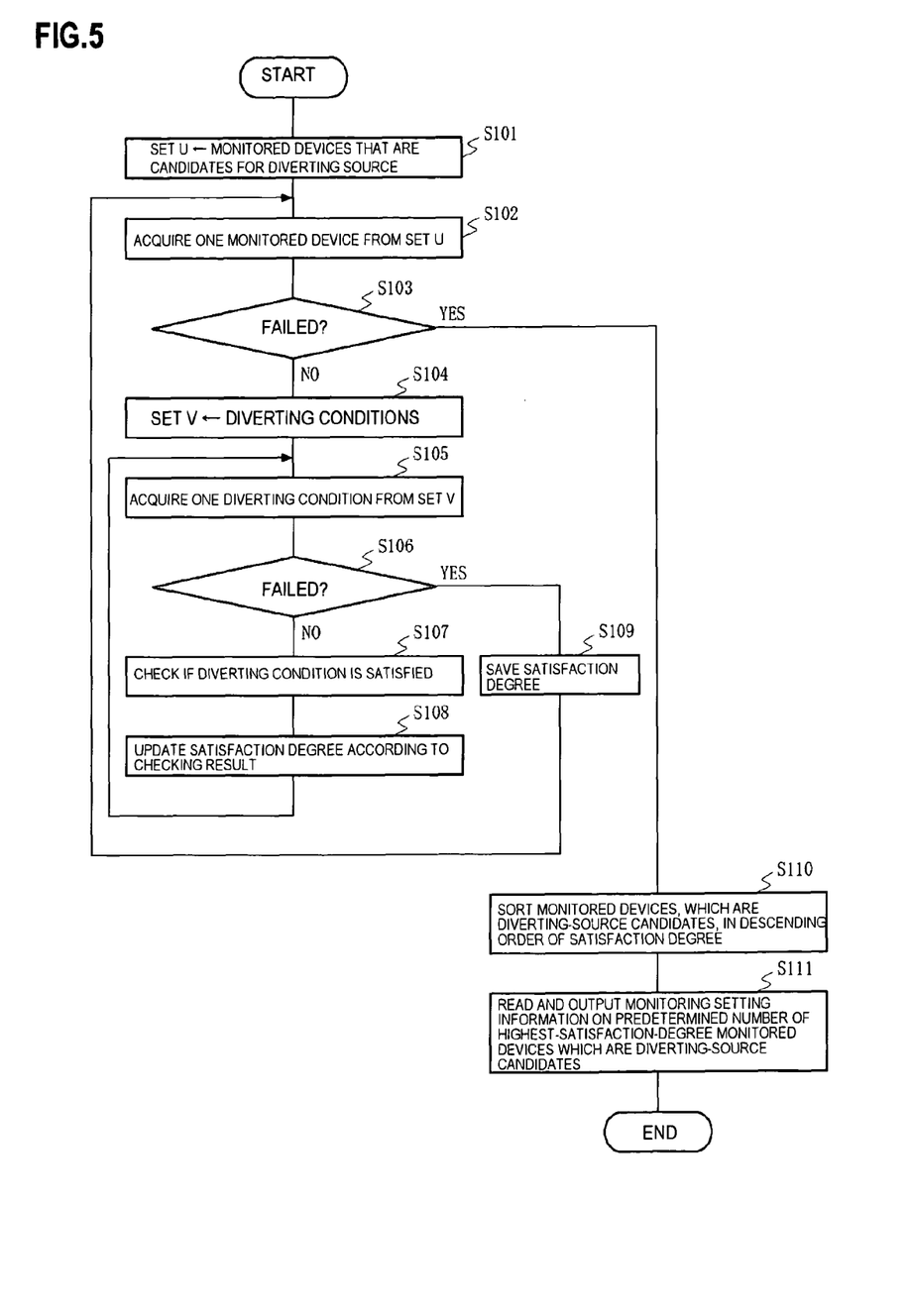
FIG. 5 is a flowchart showing an example of the processing of a first setting-diverting unit in the first exemplary embodiment of the present invention.

When the diverting-source information request is received, the first setting-diverting unit 14 of the monitoring device 1 starts the processing shown in FIG. 5. First, the first setting-diverting unit 14 stores the identifiers of the remaining monitored devices 2 other than the diverting-destination monitored device 2 in the set U as the diverting-source candidates (step S101). Next, the first setting-diverting unit 14 acquires the identifier of one monitored device 2 from the set U (step S102). If the first setting-diverting unit 14 acquires the identifier successfully, control is passed to step S104; if the first setting-diverting unit 14 fails in acquiring the identifier, control is passed to step S110 (step S103).

In step S104, the first setting-diverting unit 14 stores all diverting conditions, stored in the diverting condition storage unit 15, in the set V. Next, the first setting-diverting unit 14 acquires one diverting condition from the set V (step S105). If the first setting-diverting unit 14 acquires the diverting condition successfully, control is passed to step S107; if the first setting-diverting unit 14 fails in acquiring the diverting condition, control is passed to step S109.

In step S107, the first setting-diverting unit 14 checks if the diverting condition is satisfied. For example, in the case of the diverting condition with the identifier Dvt_0001 in FIG. 4, the first setting-diverting unit 14 reads the OS name and the version of the diverting-destination monitored device 2 and the OS name and the version of the diverting-source monitored device 2 from the monitoring data storage unit 13 and compares them to judge if the diverting condition is satisfied. In the case of the diverting condition with the identifier Dvt_0011 in FIG. 4, the first setting-diverting unit 14 reads the latest value of the CPU usage rate of the diverting-source monitored device 2 from the monitoring data storage unit 13 and compares the value with a predetermined threshold to judge if the diverting condition is satisfied. If the amount of the monitoring data is too small to make the judgment, it is judged that the condition is not satisfied. After checking the diverting condition and if it is judged that the diverting condition is satisfied, a predetermined score is added to the satisfaction degree of the monitored device 2 that is one of diverting-source candidates; if it is judged that the diverting condition is not satisfied, the score is not added (step S108). After that, control is passed back to the processing of step S105 to continue the checking of the remaining diverting conditions.

After all diverting conditions are checked and control is passed to step S109, the first setting-diverting unit 14 creates a set of the identifier of the monitored device 2 of the diverting-source candidate and the satisfaction degree, and saves the satisfaction degree. After that, control is passed back to step S102 to repeat the same processing for the remaining monitored devices 2 of the diverting-source candidates.

When the processing for all monitored devices 2 of the diverting-source candidates is finished and control is passed to step S110, the first setting-diverting unit 14 sorts the identifiers of the monitored devices 2 of the diverting-source candidates in descending order of the satisfaction degree. And, the first setting-diverting unit 14 reads the monitoring setting information on a predetermined number of monitored devices that are diverting-source candidates (for example, first one or two monitored devices with the highest satisfaction degree) from the monitoring setting information storage unit 12 and outputs the monitoring setting information to the management terminal 3 (step S111).

Figure 6:
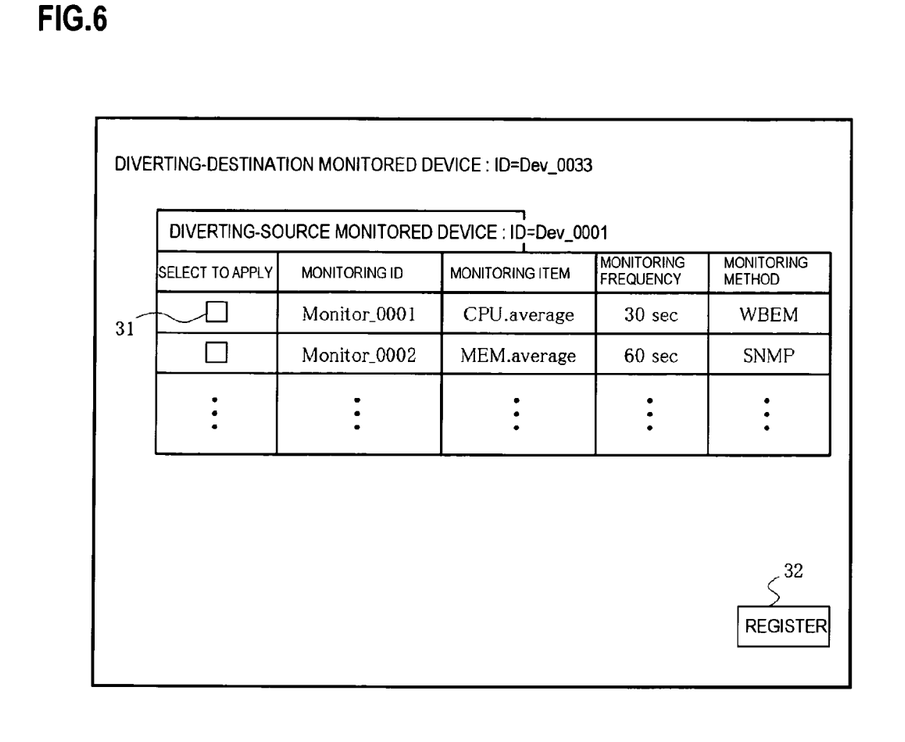
FIG. 6 is a diagram showing an example of the display screen of a management terminal in the first exemplary embodiment of the present invention.

The management terminal 3 displays the monitoring setting information, which is output from the first setting-diverting unit 14, on the screen as shown in FIG. 6. In this example, the monitored device 2 with the identifier Dev_0001 is decided as the first candidate for the diverting-source, and a list of the monitoring setting information that is set in that monitored device 2 is displayed. A selection column 31 for entering a selection mark is provided at the start of each piece of monitoring setting information to allow the system administrator to select whether or not the monitoring setting information is to be set in the diverting-destination monitored device 2. When the system administrator enters a mark in the selection column 31 and clicks a Register button 32, the monitoring setting information whose selection column 31 is marked is stored from the management terminal 3 into the monitoring setting information storage unit 12 as the monitoring setting information on the diverting destination. Next, the monitoring manager 11 reads the monitoring setting information from the monitoring setting information storage unit 12 and sends the monitoring setting information to the diverting-destination monitored device 2 via the network 4 for setting the information therein.

Next, the following describes the effect of this exemplary embodiment.

This exemplary embodiment reduces the system administrator's load involved in setting the monitoring setting information. The reason is that the monitoring setting information, which is set in another monitored device with the same or similar hardware configuration or software configuration, may be diverted and, thus, there is no need for the system administrator to create the monitoring setting information from the beginning.

In addition, in this exemplary embodiment, not only information on the static configuration, such as the OS name, but also dynamic resource information such as the CPU usage rate or the memory usage rate may be specified as a diverting condition. Therefore, a monitored device that has the same or similar configuration and, at the same time, has a load status satisfying a condition specified by the diverting condition may be extracted as the diverting source. For example, when the condition "low CPU usage rate" is added as one of the diverting conditions, a monitored device that has the same hardware or software configuration and, at the same time, has a CPU load lower than that of the diverting-destination monitored device may be extracted as the diverting source. When the CPU usage rate of a monitored device, in which monitoring setting information is already set, is increased by the monitoring setting itself, the ability described above becomes efficient means for reducing the load by reviewing the monitoring setting information.

Second Exemplary Embodiment

Figure 7:
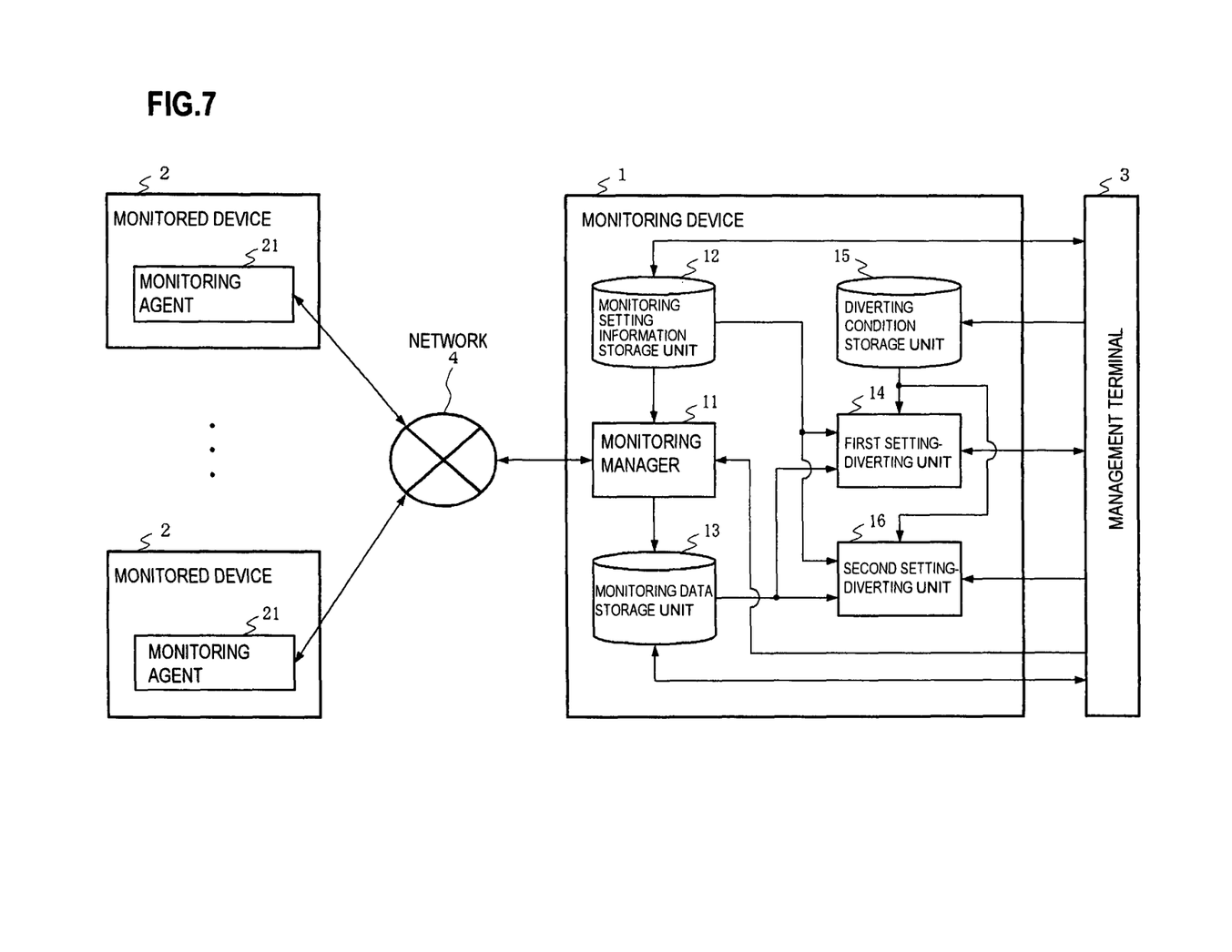
FIG. 7 is a block diagram showing a second exemplary embodiment of the present invention.

Referring to FIG. 7, a second exemplary embodiment of the present invention is similar to the first exemplary embodiment shown in FIG. 1 except that a monitoring device 1 further comprises a second setting-diverting unit 16.

The second setting-diverting unit 16 is similar to the first setting-diverting unit 14 in that it judges whether or not the monitoring setting information, which is set in a monitored device 2, may be diverted to another monitored device 2. However, they are different in that, while the first setting-diverting unit 14 receives the specification of a diverting-destination monitored device 2 from the management terminal 3 and judges whether or not the monitoring setting information that is set in another monitored device 2 may be diverted to the diverting-destination monitored device 2, the second setting-diverting unit 16 receives the specification of a diverting-source monitored device 2 from the management terminal 3 and judges whether or not the monitoring setting information that is set in the specified diverting-source monitored device 2 may be diverted to another monitored device 2.

More specifically, the second setting-diverting unit 16 calculates the satisfaction degree of the diverting conditions, stored in the diverting condition storage unit 15, for each monitored device 2 that is a candidate for the diverting destination and, by referencing the calculation result, decides a diverting-destination monitored device 2, to which the monitoring setting information that is set in the diverting-source monitored device 2 may be diverted, and displays the result on the management terminal 3.

Next, the following describes the operation of this exemplary embodiment.

To divert the monitoring setting information from one monitored device 2 for setting it in another monitored device 2 as new monitoring setting information or to review the monitoring setting information that is already set in another monitored device 2, the system administrator enters a diverting-destination information request, to which the identifier of the diverting-source monitored device 2 is attached, from the management terminal 3 to the second setting-diverting unit 16 of the monitoring device 1. In this exemplary embodiment, the diverting condition stored in the diverting condition storage unit 15 is the condition for the hardware configuration and the software configuration required for the diverting-destination monitored device 2. In addition, the system administrator confirms the diverting condition, stored in the diverting condition storage unit 15, via the management terminal 3 and, as necessary, adds new diverting conditions or deletes existing diverting conditions.

Figure 8:
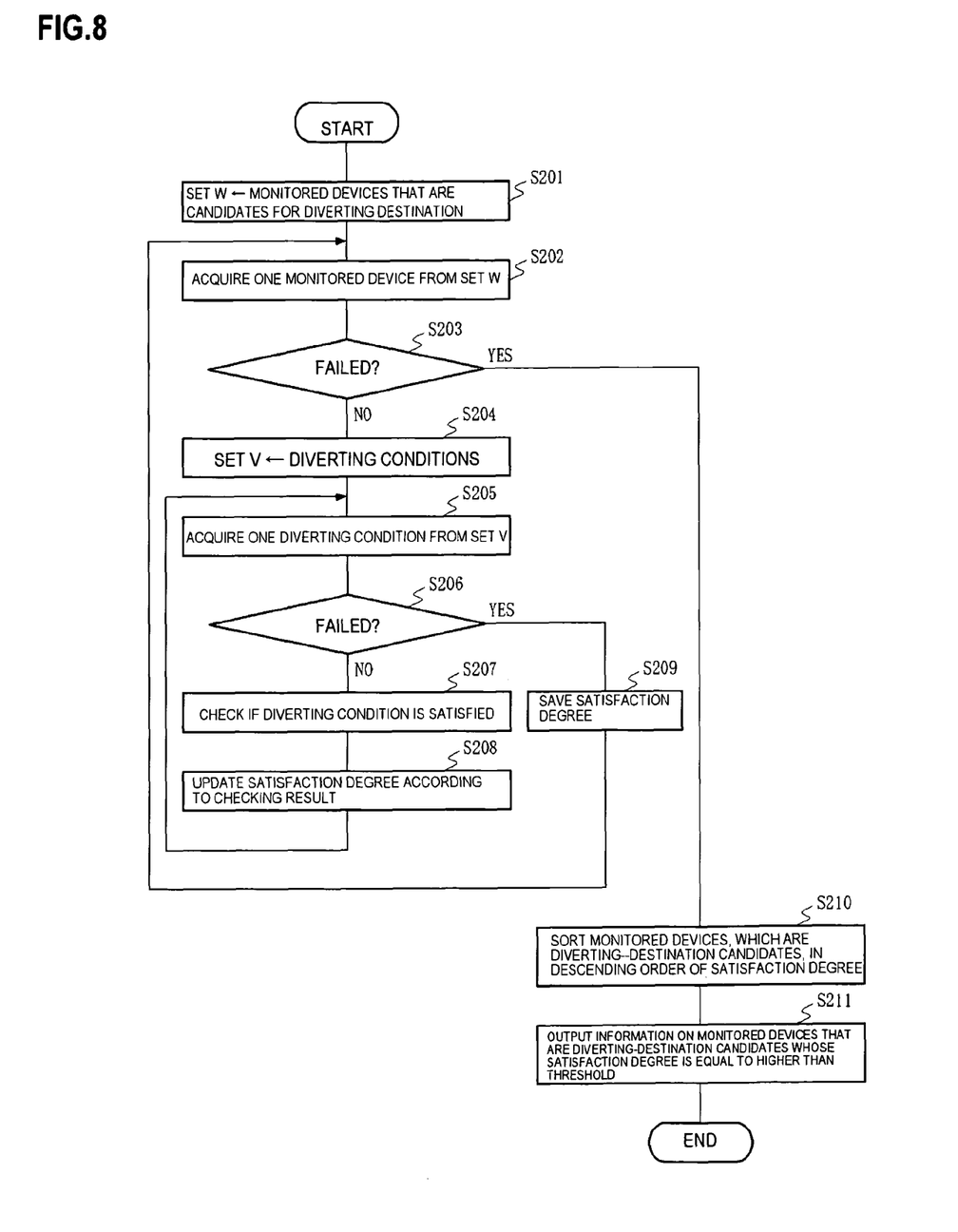
FIG. 8 is a flowchart showing an example of the processing of a second setting-diverting unit in the second exemplary embodiment of the present invention.

When the diverting-destination information request is received, the second setting-diverting unit 16 of the monitoring device 1 starts the processing shown in FIG. 8. First, the second setting-diverting unit 16 stores the identifiers of the remaining monitored devices 2 other than the diverting-source monitored device 2 in the set W as the diverting-destination candidates (step S201). Next, the second setting-diverting unit 16 acquires the identifier of one monitored device 2 from the set W (step S202). If the second setting-diverting unit 16 acquires the identifier successfully, control is passed to step S204; if the second setting-diverting unit 16 fails in acquiring the identifier, control is passed to step S210 (step S203).

In step S204, the second setting-diverting unit 16 stores all diverting conditions, stored in the diverting condition storage unit 15, in the set V. Next, the second setting-diverting unit 16 acquires one diverting condition from the set V (step S205). If the second setting-diverting unit 16 acquires the diverting condition successfully, control is passed to step S207; if the second setting-diverting unit 16 fails in acquiring the diverting condition, control is passed to step S209 (step S206).

In step S207, the second setting-diverting unit 16 checks if the diverting condition is satisfied. For example, in the case of the diverting condition with the identifier Dvt_0001 in FIG. 4, the second setting-diverting unit 16 reads the OS name and the version of the diverting-source monitored device 2 and the OS name and the version of the diverting-destination monitored device 2 from the monitoring data storage unit 13 and compares them to judge if the diverting condition is satisfied. In the case of the diverting condition with the identifier Dvt_0011 in FIG. 4, the second setting-diverting unit 16 reads the latest value of the CPU usage rate of the diverting-destination monitored device 2 from the monitoring data storage unit 13 and compares the value with a predetermined threshold to judge if the diverting condition is satisfied. If the amount of the monitoring data is too small to make the judgment, it is judged that the condition is not satisfied. After checking the diverting condition and if it is judged that the diverting condition is satisfied, a predetermined score is added to the satisfaction degree of the monitored device 2 that is one of diverting-source candidates; if it is judged that the diverting condition is not satisfied, the score is not added (step S208). After that, control is passed back to the processing of step S205 to continue the checking of the remaining diverting conditions.

After all diverting conditions are checked and control is passed to step S209, the second setting-diverting unit 16 creates a set of the identifier of the monitored device 2 of the diverting-destination candidate and the satisfaction degree, and saves the satisfaction degree. After that, control is passed back to the processing in step S202 to repeat the same processing for the remaining monitored devices 2 of the diverting-destination candidates.

When the processing for all monitored devices 2 of the diverting-destination candidates is finished and control is passed to step S210, the second setting-diverting unit 16 sorts the identifiers of the monitored devices 2 of the diverting-destination candidates in descending order of the satisfaction degree. And, the second setting-diverting unit 16 outputs the identification information on the monitored devices of the diverting-destination candidates, each of which has a satisfaction degree equal to or higher than a predetermined threshold, to the management terminal 3 (step S211).

Figure 9:
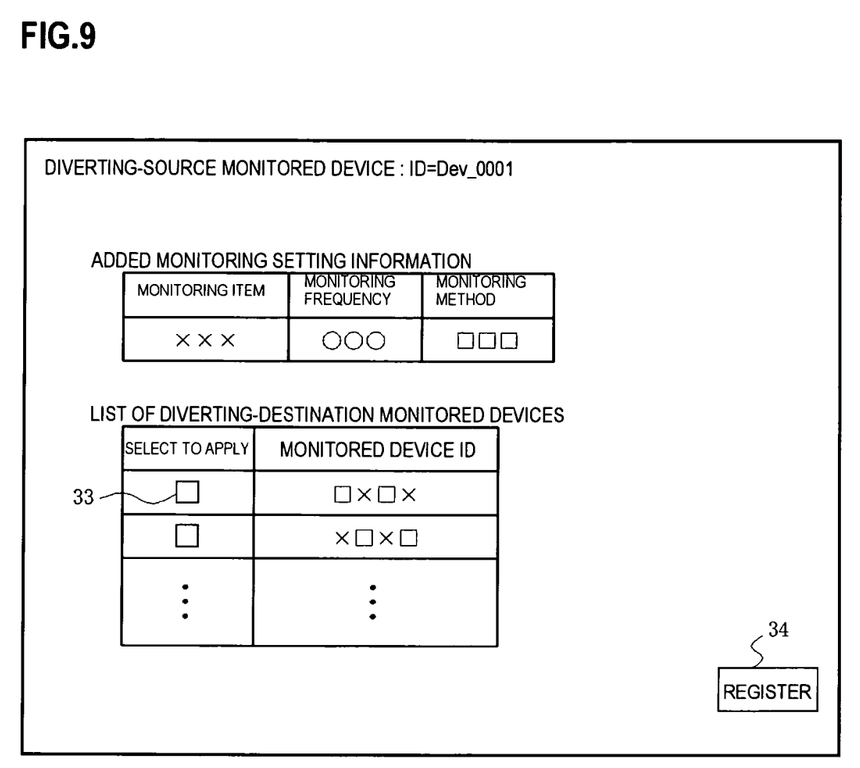
FIG. 9 is a diagram showing an example of the display screen of a management terminal in the second exemplary embodiment of the present invention.

The management terminal 3 displays the diverting-destination candidates, which are output from the second setting-diverting unit 16, on the screen as shown in FIG. 9. In this example, it is assumed that the system administrator has set a piece of new monitoring setting information in the monitored device 2 with the identifier Dev_0001 and checks if it is possible to divert the monitoring setting information, which has been set, to other monitored devices 2. To make this check, the newly added monitoring setting information is displayed at the top of the screen in FIG. 9 and the list of identifiers of the monitored devices 2 of the diverting-destination candidates is displayed below it.

A selection column 33 for entering a selection mark is provided at the start of the identifier of each monitored device 2 in the list to allow the system administrator to select if the newly added monitoring setting information is to be diverted thereto. When the system administrator enters a mark in the selection column 33 and clicks a Register button 34, the newly-added monitoring setting information displayed at the top of the screen is stored from the management terminal 3 into the monitoring setting information storage unit 12 as the monitoring setting information on the monitored device 2 whose selection column 33 is marked. Next, the monitoring manager 11 reads the monitoring setting information from the monitoring setting information storage unit 12 and sends the monitoring setting information to the diverting-destination monitored device 2 via the network 4 for setting the information therein.

Next, the following describes the effect of this exemplary embodiment.

This exemplary embodiment reduces the system administrator's load involved in setting the monitoring setting information. The reason is that this exemplary embodiment automatically judges other monitored devices, to which the monitoring setting information that has been newly set in one of the monitored devices may be diverted, and presents the information to the system administrator, thereby helping the system administrator perform the monitoring setup work.

In addition, in this exemplary embodiment, not only information on the static configuration, such as the OS name, but also dynamic resource information such as the CPU usage rate or the memory usage rate may be specified as a diverting condition. Therefore, a monitored device that has the same or similar configuration and, at the same time, has a load status satisfying a condition specified by the diverting condition may be extracted as the diverting destination. For example, when the condition "low CPU usage rate" is added as one of the diverting conditions, a monitored device that has the same hardware or software configuration and, at the same time, has a low CPU load may be extracted as the diverting destination. This is efficient for preventing the adverse effect of an increased monitored device load caused by adding new monitoring setting information.

Although the monitoring device 1 of this exemplary embodiment has the first setting-diverting unit 14 and the second setting-diverting unit 16, the first setting-diverting unit 14 may be omitted.

Third Exemplary Embodiment

Figure 10:
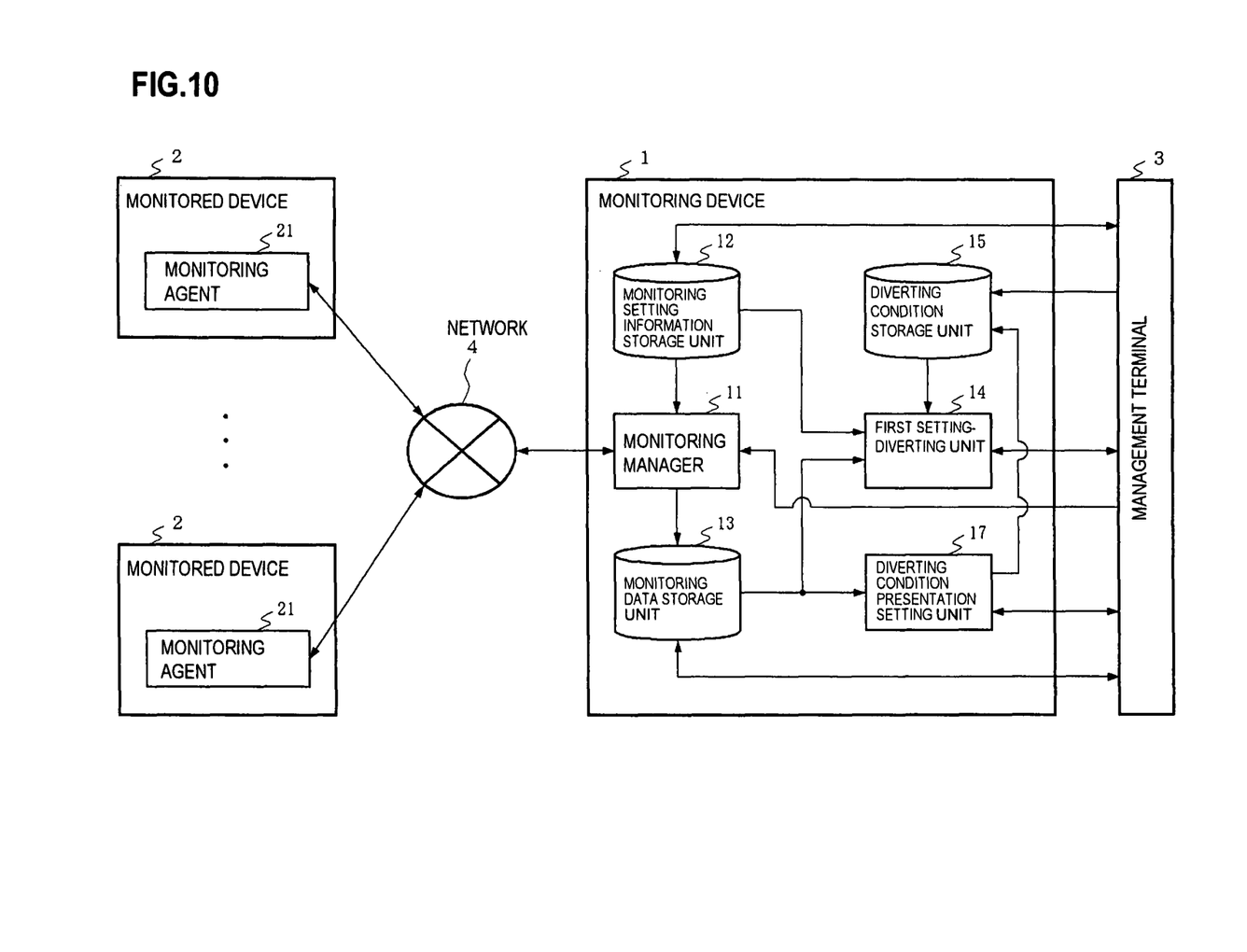
FIG. 10 is a block diagram showing a third exemplary embodiment of the present invention.

Referring to FIG. 10, a third exemplary embodiment of the present invention is similar to the first exemplary embodiment shown in FIG. 1 except that a monitoring device 1 further comprises diverting condition presentation setting unit 17.

The diverting condition presentation setting unit 17 displays the resource statuses, which are included in the monitoring data on the monitored devices 2 stored in monitoring data storage unit 13, on the screen of a management terminal 3. And, when the system administrator specifies that a resource status selected on the screen be set as a diverting condition, the diverting condition presentation setting unit 17 sets a resource status, which indicates the reverse of the selected resource status, in diverting condition storage unit 15. Here, the resource status means a CPU usage rate, a memory usage rate, and so on. The reverse of a resource status means, for example, the status in which the CPU usage rate is low when the CPU usage rate is high.

As described in the effect of the first exemplary embodiment, if dynamic resource information such as the CPU usage rate or the memory usage rate is specified as a diverting condition, the monitored device 2, whose load status satisfies the condition specified by the diverting condition, may be extracted as a diverting source. For example, if the CPU usage rate of the monitored device 2, in which some monitoring setting information is already set, is increased and, in this case, if the condition "low CPU usage rate" that is the reverse of the status is added as one of the diverting conditions, the monitored device 2 that has the same hardware or software configuration and that has a CPU load lower than that of the diverting-destination monitored device 2 can be extracted as the diverting source. In this embodiment, when the CPU load of the diverting-destination monitored device 2 is high, the diverting condition presentation setting unit 17 displays the information on the management terminal 3 indicating that the CPU load is high. When the system administrator selects this status and specifies that the status be set as one of diverting conditions, the diverting condition presentation setting unit 17 sets the diverting condition "low CPU load", which is the reverse of the resource status, in the diverting condition storage unit 15. This setting method allows the system administrator to perform the diverting condition setting work more efficiently.

The "function to set the resource status, which indicates the reverse of a resource status, in the diverting condition storage unit 15" described above may be thought of as a function to accept an update instruction of a diverting condition that optimizes the resource status of a monitored device.

While the exemplary embodiments of the present invention have been described, it is to be understood that the present invention is not limited to the exemplary embodiments described above and that various additions, changes, and adjustments may be made. For example, the monitoring device 1 of the present invention need not be a computer physically separate from the monitored device 2 but the computer constituting one of the monitored devices 2 may be used as the monitoring device 1. The function of the monitoring device 1 of the present invention may be implemented not only by hardware but also by a computer and a program. The program is recorded in a computer-readable recording medium, such as a magnetic disk or a semiconductor memory, for distribution. When the computer is started, the program is read into the computer for controlling the computer operation and causes the computer to function as the monitoring device 1 in the embodiments described above for executing the above-described processing. The various disclosed elements may be combined, replaced, and selected in various ways within the scope of the claims of the present invention.

INDUSTRIAL APPLICABILITY

The present invention provides an efficient device and means for monitoring an information processing system that allows the user to exchange and share data via the Internet.

In particular, the present invention is applicable to the monitoring of a large information processing system that has many devices of various types as monitored devices.

What is claimed is:

1. A monitoring device comprising:
    a monitoring manager configured to set up a monitoring setting information to a first monitoring agent installed in a first monitored device and a second monitoring agent installed in a second monitored device, and configured to receive monitoring data comprising resource consumption of a hardware or a software from the first and the second monitoring agents, and configured to store the received monitoring data in a monitoring data storage unit; and
    the first monitoring agent monitors hardware or software of the first monitored device according to monitoring setting information comprising metrics regarding the resource of the first monitored device; and
    the second monitoring agent monitors hardware or software of the second monitored device according to monitoring setting information comprising metrics regarding the resource of the second monitored device; and
    a diverting condition storage unit that stores diverting conditions comprising resource requirement of the second monitored device for setting a monitoring setting information of the first monitoring agent as a monitoring setting information of the second monitoring agent; and
    a diverting unit that receives an identifier of the second monitored device, and judges if the monitoring setting information of the first monitored agent is available to be set as the monitoring setting information of the second monitored agent by referencing the monitoring data of the first monitored device and the diverting conditions of the second monitored device, and
    outputs the judged result when shows the monitoring setting information of the first monitoring agent is available to be set as a monitoring setting information of the second monitoring agent.

2. The monitoring device as defined by claim 1,
    wherein the diverting unit calculates a satisfaction score, which is a degree of conformance to the diverting conditions for diverting the monitoring setting information of each first monitored agent, and detects a diverting-source monitored device, of which the monitoring setting information is available to be set as monitoring setting information of the second monitoring agent by referencing the satisfaction scores.

3. The monitoring device as defined by claim 1, further comprising:
    a diverting condition presentation setting unit that displays a resource status describing resource consumption, which is included in monitoring data on the first monitored device stored in the monitoring data storage unit, on a screen of the management terminal and, when a system administrator selects the displayed resource status and specifies that the displayed resource status be modified, the diverting condition presentation setting unit shows diverting conditions of the second monitored device in the diverting condition storage unit.

4. The monitoring device of claim 1, wherein the dynamic resources information comprises a CPU use rate or a memory use rate.

5. The monitoring device of claim 1, wherein the diverting unit calculates a total satisfaction score by adding a plurality of satisfaction scores, and detects a diverting-source monitored device, of which the monitoring setting information is available to be set as monitoring setting information of the second monitoring agent by referencing the total satisfaction scores,
    wherein each of the satisfaction scores is set when a corresponding diverting condition, stored in the diverting condition storage unit, is satisfied.

6. A monitoring system comprising:
    a plurality of monitored devices each of which has a monitoring agent;
    a monitoring device connected communicably to said plurality of monitored devices; and
    a management terminal connected to said monitoring device,
    wherein said monitoring device comprises:
    a monitoring manager configured to monitor a first monitoring agent in a first monitored device and a second monitoring agent in a second monitored device according to monitoring setting information stored in a monitoring setting information storage unit, receive monitoring data on hardware configurations or software configurations from the first and second monitoring agents, and store the received monitoring data in a monitoring data storage unit;
    a diverting condition storage unit that stores diverting conditions describing hardware configurations or software configurations for diverting monitoring setting information corresponding to the first monitored device, which is a diverting source monitored device; and
    a diverting unit that receives an identifier of the second monitored device, which is a diverting-destination monitored device and judges if the monitoring setting information corresponding to the first monitored device is available to be set as monitoring setting information on the second monitored device by referencing the monitoring data of the first monitored device and the diverting conditions, and outputs the judged result to said management terminal, wherein the monitoring data comprises dynamic resource information, which is information that varies during operation of the monitoring device and the diverting conditions comprises the dynamic resource information required by the first monitored device.

7. A monitoring method for monitoring monitored devices by a computer connected communicably to a plurality of said monitored devices, each of which has a monitoring agent, said monitoring method comprises:

judging, by said computer, if monitoring setting information, which is set in a first monitored device that is a diverting-source monitored device, is available to be set as monitoring setting information on a second monitored device that is a diverting-destination monitored device, by referencing monitoring data of the first monitored device and the diverting conditions and outputting the judged result to a management terminal, said monitoring data being data on hardware configurations or software configurations of the first and second monitored devices stored in a storage unit, said monitoring setting information conditions describing the required hardware configurations or software configurations;

setting, by said computer, monitoring setting information, which is stored in said storage unit, in the monitoring agent of the monitored device according to an instruction from said management terminal; and receiving, by said computer, monitoring data on the hardware configuration and the software configuration sent from the respective monitoring agent and storing the received monitoring data in said storage unit, wherein the monitoring data comprises dynamic resource information, which is information that varies during operation of the monitoring device and the diverting conditions comprises the dynamic resource information required by the first monitored device.

8. The monitoring method as defined by claim 7, wherein said judging comprises:

receiving a specification of a diverting-destination monitored device from said management terminal, and judging if monitoring setting information, which is set in the monitored device other than the specified diverting-destination monitored device, may be imported as monitoring setting information on said diverting-destination monitored device.

9. The monitoring method as defined by claim 8, wherein said judging comprises:

calculating a satisfaction degree of the diverting conditions for each monitored device, which is a diverting-source candidate; and deciding a diverting-source monitored device, from which monitoring setting information is importable to said diverting-destination monitored device, by referencing the calculation result.

10. The monitoring method as defined by claim 7, wherein said judging comprises:

receiving a specification of a diverting-source monitored device from said management terminal; and judging if monitoring setting information, which is set in the specified diverting-source monitored device, is available to be set as monitoring setting information on the other monitored device.

11. The monitoring method as defined by claim 10, wherein said judging comprises:

calculating a satisfaction degree of the diverting conditions for each monitored device, which is a diverting-destination candidate; and deciding a diverting-destination monitored device, to which monitoring setting information that is set in the diverting-source monitored device importable, by referencing the calculation result.

12. The monitoring method as defined by claim 7, wherein the dynamic resources information comprises a CPU use rate or a memory use rate.

13. A non-transitory computer readable medium having stored thereon a program that causes a computer, connected communicably to a plurality of monitored devices each of which has a monitoring agent, to perform:

a first process of judging if monitoring setting information, which is set in a first monitored device that is a diverting-source monitored device, is available to be set as monitoring setting information on a second monitored device that is a diverting-destination monitored device, by referencing monitoring data of the first monitored device and the diverting conditions and diverting conditions and outputting the judged result to a management terminal, said monitoring data being data on hardware configurations or software configurations of the monitored devices stored in a storage unit, said diverting conditions describing the required hardware configurations or software configurations; a second process of setting monitoring setting information, which is stored in said storage unit, in the monitoring agent of the monitored device according to an instruction from said management terminal; and a third process of receiving monitoring data on the hardware configuration and the software configuration sent from the respective monitoring agent and storing the received monitoring data in said storage unit, wherein the monitoring data comprises dynamic resource information, which is information that varies during operation of the monitoring device and the diverting conditions comprises the dynamic resource information required by the first monitored device.

14. The program as defined by claim 13, wherein said first process comprises the processes of:

receiving a specification of a diverting-destination monitored device from said management terminal; and judging if monitoring setting information, which is set in the monitored device other than the specified diverting-destination monitored device, is available to be set as monitoring setting information on said diverting-destination monitored device.

15. The program as defined by claim 14, wherein said first process comprises the processes of:

calculating a satisfaction degree of the diverting conditions for each monitored device, which is a diverting-source candidate; and deciding a diverting-source monitored device, from which monitoring setting information is importable to said diverting-destination monitored device, by referencing the calculation result.

16. The program as defined by claim 13, wherein said first process comprises the processes of:

receiving a specification of a diverting-source monitored device from said management terminal; and judging if the monitoring setting information, which is set in the specified diverting-source monitored device, is available to be set as monitoring setting information on the other monitored device.

17. The program as defined by claim 16, wherein said first process comprises the processes of:

calculating a satisfaction degree of the diverting conditions for each monitored device, which is a diverting-destination candidate; and deciding a diverting-destination monitored device, to which the monitoring setting information that is set in the diverting-source monitored device importable, by referencing the calculation result.

18. The program as defined by claim 13, wherein the dynamic resources information comprises a CPU use rate or a memory use rate.

19. A monitoring device comprising:

a monitoring manager configured to set up a monitoring setting information to a first monitoring agent installed in a first monitored device and a second monitoring agent installed in a second monitored device, and configured to receive monitoring data comprising the resource consumption of the hardware or the software from the first and the second monitoring agent, and configured to store the received monitoring data in a monitoring data storage unit; and the first monitoring agent monitors hardware or software of the first monitored device according to monitoring setting information comprising the metrics regarding the resource of a device; and the second monitoring agent monitors hardware or software of the second monitored device according to monitoring setting information comprising the metrics regarding the resource of a device; and a diverting condition storage unit that stores diverting conditions comprising the resource requirements of the first monitored device for setting a monitoring setting information of the first monitoring agent as a monitoring setting information of the second monitoring agent; and a diverting unit that receives an identifier of the first monitored device, and judges if the monitoring setting information of the first monitoring agent is available to be set as a monitoring setting information of the second monitoring agent by referencing the monitoring data of the second monitored device and the diverting condition of the first monitored device, and outputs the judged result, which shows the monitoring setting information of the second monitoring agent is available to be set as a monitoring setting information of the first monitoring agent.

20. The monitoring device as defined by claim 19, wherein the diverting unit calculates a satisfaction score, which is a degree of conformance to the diverting conditions for diverting the monitoring setting information of each second monitoring agent, and detects second monitored device, of which the monitoring setting information is available to be set as monitoring setting information of the first monitoring agent by referencing the satisfaction scores.

21. The monitoring device of claim 19, wherein the diverting unit calculates a total satisfaction score by adding a plurality of satisfaction scores, and detects a diverting-source monitored device, of which the monitoring setting information is available to be set as monitoring setting information of the second monitoring agent by referencing the total satisfaction scores, wherein each of the satisfaction scores is set when a corresponding diverting condition, stored in the diverting condition storage unit, is satisfied.

* * * * *